United States Patent
Knock

(10) Patent No.: US 12,493,865 B2
(45) Date of Patent: *Dec. 9, 2025

(54) WATCH SKINS SELECTION APPLICATION WITH BLOCKCHAIN TOKEN

(71) Applicant: Watch Skins Corporation, San Juan, PR (US)

(72) Inventor: Collin Knock, San Juan, PR (US)

(73) Assignee: Watch Skins Corporation, San Juan, PR (US)

( * ) Notice: Subject to any disclaimer, the term of this patent is extended or adjusted under 35 U.S.C. 154(b) by 997 days.

This patent is subject to a terminal disclaimer.

(21) Appl. No.: 17/558,226

(22) Filed: Dec. 21, 2021

(65) Prior Publication Data

US 2022/0114567 A1     Apr. 14, 2022

Related U.S. Application Data

(63) Continuation of application No. 17/249,847, filed on Mar. 16, 2021, now Pat. No. 11,263,607, which is a
(Continued)

(51) Int. Cl.
*G06Q 20/12*     (2012.01)
*G04G 9/08*     (2006.01)
(Continued)

(52) U.S. Cl.
CPC .............. *G06Q 20/123* (2013.01); *G04G 9/08* (2013.01); *G06Q 20/0658* (2013.01);
(Continued)

(58) Field of Classification Search
CPC .......................................... G06Q 20/123–1235
See application file for complete search history.

(56) References Cited

U.S. PATENT DOCUMENTS

| 9,621,678 B1 | 4/2017 | Guastaferro |
| 10,373,158 B1 | 8/2019 | James |

(Continued)

FOREIGN PATENT DOCUMENTS

| JP | 2019083013 | 5/2019 |
| JP | 2019083013 A | 5/2019 |

(Continued)

OTHER PUBLICATIONS

Tim Swanson. "Great Chain of Numbers: A Guide to Smart Contracts, Smart Property and Trustless Asset Management." (2014). Retrieved online Jul. 6, 2022. https://s3-us-west-2.amazonaws.com/chainbook/Great+Chain+of+Numbers+A+Guide+to+Smart+ (Contracts%2C+Smart+Property+and+Trustless+Asset+Management+-+Ti (Year: 2014).

(Continued)

*Primary Examiner* — Jay Huang
(74) *Attorney, Agent, or Firm* — Esplin & Associates, PC

(57) ABSTRACT

Electronic watch faces can be created in customized and associated with a block chain system. More particularly, the block chain's system uses non-fungible tokens which are in general unique, to represent the ownership of a specific watch face. Users own the token and can display the watch face only while they own the token. After selling the watch face, the token is changed to represent the new owner of the token and the original owner can no longer display the watch face at that point.

16 Claims, 7 Drawing Sheets

Related U.S. Application Data continuation of application No. 16/520,246, filed on Jul. 23, 2019, now Pat. No. 11,250,399.

(60) Provisional application No. 62/773,064, filed on Nov. 29, 2018.

(51) Int. Cl.
| | | |
|---|---|---|
| *G06Q 20/06* | (2012.01) | |
| *G06Q 20/36* | (2012.01) | |
| *G06Q 20/38* | (2012.01) | |
| *G06Q 30/0601* | (2023.01) | |
| *H04L 9/06* | (2006.01) | |

(52) U.S. Cl.
CPC ....... *G06Q 20/3678* (2013.01); *G06Q 20/389* (2013.01); *G06Q 30/0621* (2013.01); *H04L 9/0637* (2013.01)

(56) References Cited

U.S. PATENT DOCUMENTS

| | | |
|---|---|---|
| 10,427,045 B2 | 10/2019 | Thompson |
| 10,540,653 B1 | 1/2020 | James |
| 10,540,654 B1 | 1/2020 | James |
| 10,546,326 B2 | 1/2020 | Publicover |
| 10,565,616 B2 | 2/2020 | Thompson |
| 10,565,623 B2 | 2/2020 | Katz |
| 10,580,043 B2 | 3/2020 | Publicover |
| 10,600,009 B1 | 3/2020 | Augustine |
| 10,701,067 B1 | 6/2020 | Ziraknejad |
| 10,708,042 B1 | 7/2020 | Rubenstein |
| 10,936,647 B2 | 3/2021 | Abuelsaad |
| 11,080,687 B2 | 8/2021 | Vladi |
| 11,120,475 B2 | 9/2021 | Katz |
| 11,127,048 B2 | 9/2021 | Publicover |
| 11,133,936 B1 | 9/2021 | Branton |
| 11,182,467 B1 | 11/2021 | Medina |
| 11,200,569 B1 | 12/2021 | James |
| 11,200,869 B1 | 12/2021 | Post |
| 11,250,399 B2 | 2/2022 | Knock |
| 11,308,487 B1 | 4/2022 | Foster |
| 11,316,691 B2 | 4/2022 | Westland |
| 11,334,883 B1 | 5/2022 | Auerbach |
| 11,341,451 B2 | 5/2022 | Benayoun |
| 2002/0099452 A1 | 7/2002 | Kawai |
| 2015/0025975 A1 | 1/2015 | Wallach |
| 2015/0213504 A1 | 7/2015 | Katz |
| 2015/0319161 A1 | 11/2015 | Dimmick |
| 2016/0253710 A1 | 9/2016 | Publicover |
| 2017/0201779 A1 | 7/2017 | Publicover |
| 2017/0357426 A1* | 12/2017 | Wilson .................. G06F 3/0488 |
| 2018/0091316 A1 | 3/2018 | Stradling |
| 2018/0225660 A1 | 8/2018 | Chapman |
| 2018/0308120 A1 | 10/2018 | Cullen |
| 2018/0310046 A1 | 10/2018 | Cullen |
| 2018/0331835 A1 | 11/2018 | Jackson |
| 2019/0015747 A1 | 1/2019 | Thompson |
| 2019/0019218 A1 | 1/2019 | Thompson |
| 2019/0172025 A1 | 6/2019 | Riccardo |
| 2019/0220836 A1 | 7/2019 | Caldwell |
| 2020/0005284 A1* | 1/2020 | Vijayan ................ G06Q 20/065 |
| 2020/0090208 A1 | 3/2020 | Reichenbach |
| 2020/0110814 A1 | 4/2020 | Abuelsaad |
| 2020/0118068 A1 | 4/2020 | Turetsky |
| 2020/0143426 A1 | 5/2020 | Katz |
| 2020/0175485 A1 | 6/2020 | Knock |
| 2020/0225655 A1 | 7/2020 | Cella |
| 2020/0242105 A1* | 7/2020 | Rich ......................... H04L 9/40 |
| 2020/0297269 A1 | 9/2020 | Riccardo |
| 2020/0327609 A1 | 10/2020 | Dubrofsky |
| 2020/0348662 A1 | 11/2020 | Cella |
| 2020/0349610 A1 | 11/2020 | Publicover |
| 2020/0349611 A1 | 11/2020 | Publicover |
| 2020/0374113 A1 | 11/2020 | Noam |
| 2020/0380476 A1 | 12/2020 | Trudeau |
| 2020/0393957 A1 | 12/2020 | Wilson |
| 2021/0119785 A1 | 4/2021 | Ben-Reuven |
| 2021/0157312 A1 | 5/2021 | Cella |
| 2021/0201280 A1 | 7/2021 | Knock |
| 2021/0248560 A1 | 8/2021 | Rajendran |
| 2021/0342822 A1 | 11/2021 | Lau |
| 2021/0365948 A1 | 11/2021 | Briscombe |
| 2021/0374807 A1 | 12/2021 | Katz |
| 2022/0036405 A1 | 2/2022 | Publicover |
| 2022/0075845 A1 | 3/2022 | Bowen |
| 2022/0108262 A1 | 4/2022 | Cella |
| 2022/0114600 A1 | 4/2022 | Blackburn |
| 2022/0146822 A1 | 5/2022 | El-Ghoroury |
| 2022/0150570 A1 | 5/2022 | Weerasinghe |
| 2022/0164815 A1 | 5/2022 | Petersen |
| 2022/0207615 A1 | 6/2022 | Naqvi |
| 2022/0261853 A1 | 8/2022 | Publicover |
| 2022/0300966 A1 | 9/2022 | Andon |
| 2022/0391888 A1 | 12/2022 | Kim |
| 2023/0004125 A1 | 1/2023 | Knock |
| 2023/0101814 A1 | 3/2023 | Knock |
| 2023/0108983 A1 | 4/2023 | Vosseller |

FOREIGN PATENT DOCUMENTS

| | | |
|---|---|---|
| JP | 2019096272 | 6/2019 |
| JP | 2019096272 A | 6/2019 |
| JP | 2020068388 | 4/2020 |
| JP | 2020068388 A | 4/2020 |

OTHER PUBLICATIONS

United Nations Economic Commission for Europe, United Nations Centre for Trade Facilitation and Electronic Business. "White Paper Blockchain in Trade Facilitation." (2020). Retrieved online Jul. 6, 2022. https://unece.org/DAM/trade/Publications/ ECE-TRADE-457E_WPBlockchainTF.pdf (Year: 2020).

Thiago Bueno et al. "Blockchain and Industry 4.0: Overview, Convergence, and Analysis." (Jan. 2020). Retrieved online Jul. 6, 2022. https://www.researchgate.net/publication/338358883_Blockchain_and_Industry_40_Overview_Convergence_and_Analysis/link/5f902b70299bf1b53e37affc/download (Year: 2020).

PCT Search Report and Written Opinion for Application No. PCT/US23/015286, mailed Apr. 17, 2023 (10pages).

PCT Search Report and Written Opinion for Application No. PCT/US23/016753 mailed Apr. 24, 2023 (7 pages).

Thiago Bueno et al. Blockchain and Industry 4.0: Overview, Convergence, and Analysis. (Jan. 2020). 33 pages.

Tim Swanson. Great Chain of Numbers: a Guide to Smart Contracts, Smart Property and Tmstless Asset Management. (2014) 130 pages.

United Nations Economic Commission for Europe, United Nations Centre for Trade Facilitation and Electronic Business. White Paper Blockchain in Trade Facilitation. (2020). 159 pages.

* cited by examiner

Bezel

Numbers or Numerals

Hands

Brand/Logo

Date Window

Hour Marker

Face/Background

Face/Background

Face/Background

Simulated Diamonds

Brightness Controll

Simulated Metal Gear Movement

WATCH SKINS SELECTION APPLICATION WITH BLOCKCHAIN TOKEN

PRIORITY

This application is a continuation of U.S. patent application Ser. No. 17/249,847, filed Mar. 16, 2021; which is a continuation of U.S. patent application Ser. No. 16/520,246, filed Jul. 23, 2019; which claims priority from U.S. Patent Provisional Application No. 62/773,064, filed Nov. 29, 2018; each of which are herewith incorporated by reference.

BACKGROUND

Electronic watches, such as the "Apple watch™ enable reconfiguration of different characteristics of the watch.

The watches can have different faces which can be electronically created. However, the inventors recognized that these faces are in an unlimited quantity, have no scarcity, and also can be easily copied since they have no reliable means of authentication.

SUMMARY

The inventor recognizes that electronic watch characteristics can be displayed and offered to users in different and exciting ways. According to different embodiments, a number of different watch faces are obtained by a user. The faces can be customized.

In one embodiment, the faces can be displayed like a watch display case.

In an embodiment, high end watch faces are added to an application, which a user has the opportunity to obtain and update. Many of these faces create a digital replica watch face of existing analog watches.

The inventor, however, recognized that, any watch face that is made can have an unlimited number of copies. According to an embodiment, a digital watch face is created that is added to a cryptographic system, e.g., a block chain token, smart contract, or distributed ledger where only a certain enumerated number of the watch faces are created. Each individual watch face is associated with the cryptographic system, e.g., associated with a non fungible and unique block chain token.

BRIEF DESCRIPTION OF THE DRAWINGS

The different figures show different embodiments in which.

DETAILED DESCRIPTION

An embodiment stores and allows customization of, digital watch faces.

Figure 1A:
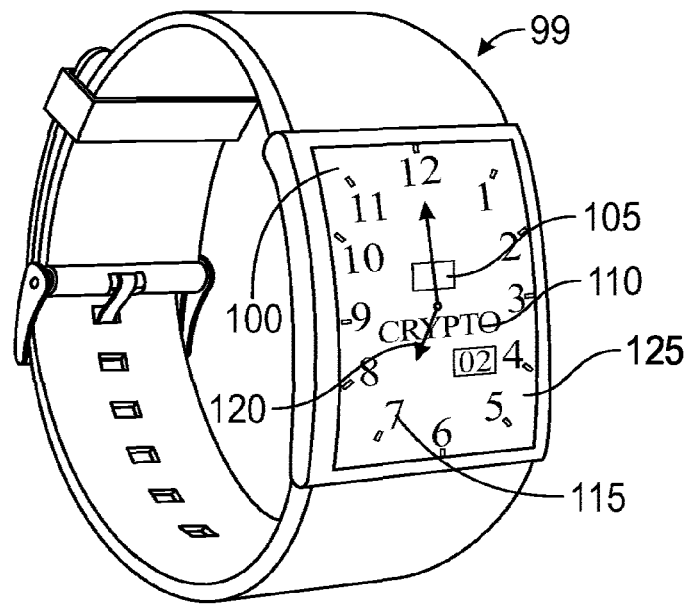
FIG. 1A shows a watch face.
Figure 1B:
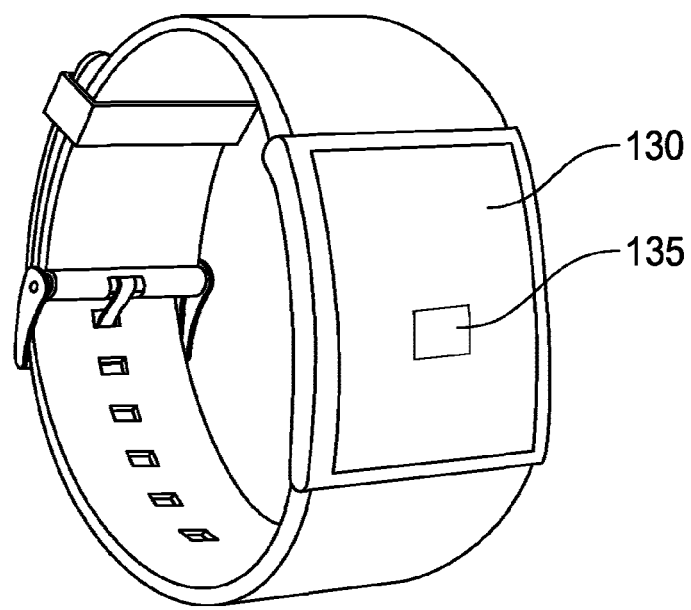
FIG. 1B shows accenting portions of the watch face.

FIGS. 1A and 1B show watches with the watch faces obtained and created according to an embodiment, on a face of an electronic and digitally controllable watch 99. The watch 99 may have, for example, a housing as conventional, with a screen 100 of liquid crystal or OLED face that can display any desired features that are provided from its internal memory and driven by an internal processor. The watch can also have a wifi or other internet function to communicate with a cellular phone, or one or more servers. According to a first embodiment, a digital watch 99 is shown with a watch face 100. In this embodiment, the watch face 100 includes a logo and look and feel, from an existing Crypto™ watch. However, in general, famous make watchmakers may license their names and the likenesses of their analog watches.

In one specific embodiment described herein, the number of watch faces which can be created this way is limited by associating each authorized watch face with a cryptographic token, and requiring that the watch face can only be shown on the watch by the owner of the cryptographic token, or when the cryptographic token is otherwise verified as being legitimate for the specific watch face. In one embodiment, the cryptographic token is a blockchain based token. In one embodiment, the cryptographic token is a smart contract, which is a computer program/machine intended to digitally facilitate, verify, or enforce the negotiation or performance of a contract. In one embodiment, the cryptographic token uses the Ethereum smart contract framework. In another embodiment, the unique identifying information is stored on a distributed ledger, e.g, of a blockchain system, or any other electronic consensus of replicated, shared, and synchronized digital data.

The watch face 100 includes a logo 105, a brand-name 110, numbers 115, and clock hands 120. In an embodiment, the user also has the opportunity to change the characteristics. In FIG. 1A, there is a black background 125, and watch icons over the background. All of the lettering, such as the logo 105, the numbers 115, and the clock hands 120 are shown as being the color gold, using simulated metal fonts and high definition video of shiny gold. Alternatively, silver or chrome, or colored chromes and diamonds or other precious stones to create the image of a high end designer analog watch displayed on the face of the digital watch to simulate shiny jewelry.

The user can also change the watchface to a different color scheme is shown in FIG. 1B, which shows a white face 130, with gold accents 135. In similar ways, the user can have a black face, red chrome, blue chrome, orange chrome, Green chrome, green chrome and black chrome or matte colors. There are nearly endless combinations of colors and stylistic elements that can be customized in this way.

In an embodiment, established watch companies can license their brands to the app or platform, and the watch faces can then be digitally copied and sold on the app store or on the platform on WatchSkins.com. In different embodiments, this can be used for watch brands, influencers, athletes, professional companies, sports companies, and celebrities, although any kind of company can use their watch face or can create a logo and/or theme which is then used for the watch face.

The operation includes an in-app platform on the iOS system using a mobile phone, in which the user can customize the watch face within a design suite tool allowing for custom designs. The invention also contemplates an Android version of the same app. In one embodiment, there is a back end administrator integration tool associated with the front end app or computer, that allows for the creation of one of a kind watches, as well as allows brand partners to establish their configuration parameters.

Figure 2:
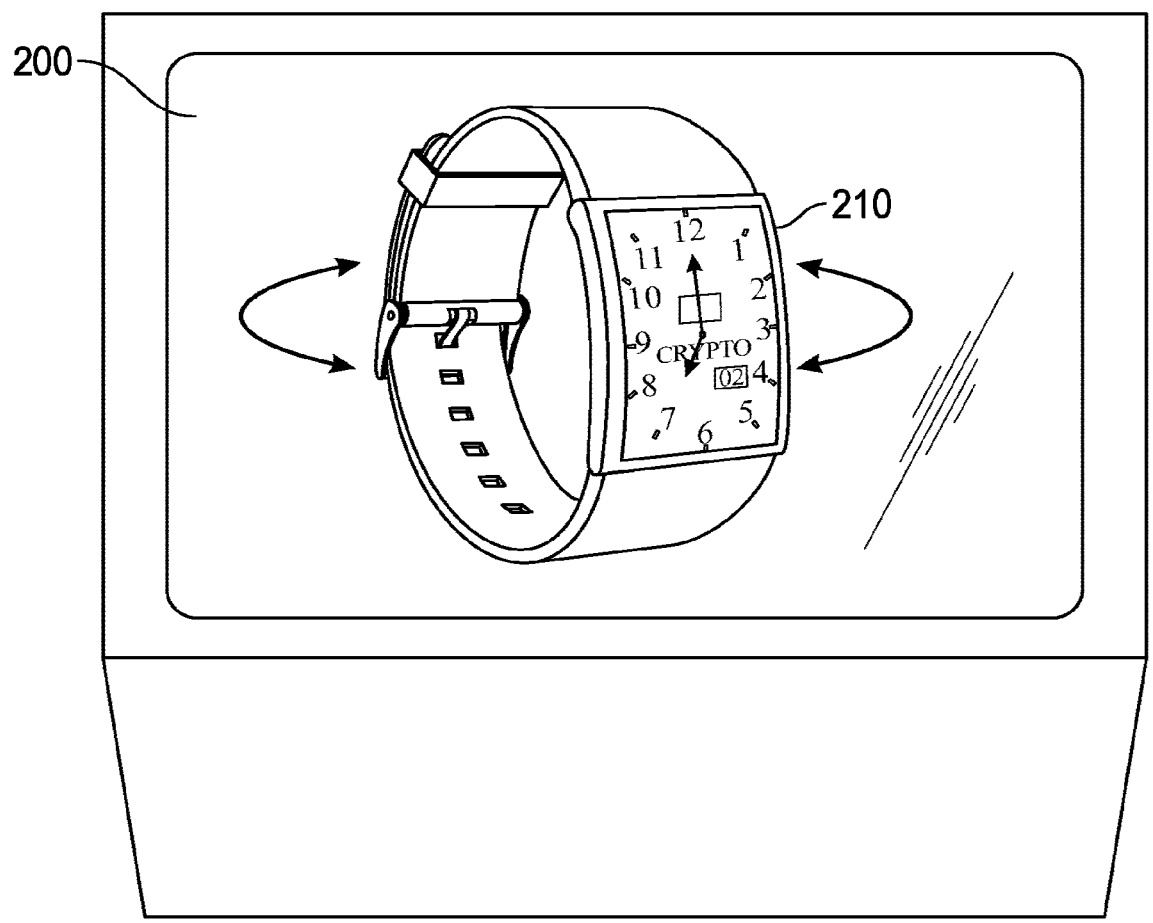
FIG. 2 shows the configuration platform.

FIG. 2 illustrates a digital watch collection showcased in a virtual watch case display case 200. The display case 200 shows a specific watch face image 210. This shows an image of the watch and allows the user to make certain customizations such as color scheme and the like, and also to spin the watch in 3D to see different parts of the watch.

Figure 3A:
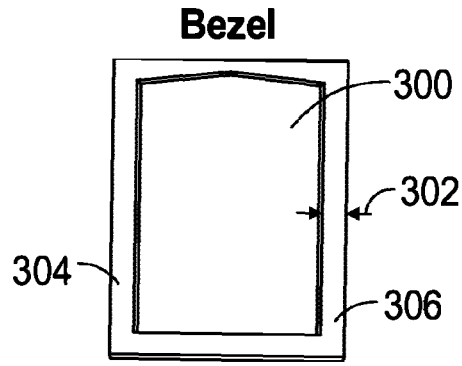
FIGS. 3A-3F show different customizable features.

FIG. 3A to 3F show different customizable features. FIG. 3A illustrates how the bezel can be customized 300, the bezel customization including allowing customizing the width of the bezel shown as 302, the color of the bezel 304, and the texture of the bezel 306. The user can customize any of these things for their own watch faces and choose from adding a bezel, adding simulated diamonds on the bezel, or the color of the bezel.

Figure 3B:
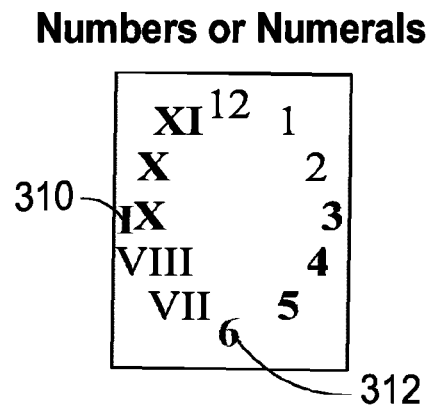

FIG. 3B shows customization of the bezel face. In FIG. 3B, the user can choose between Roman numerals 310 or numbers 312, and can also choose between the different styles that they want, e.g., four numbers versus 12 numbers, and can also choose color, texture, font and size.

Figure 3C:
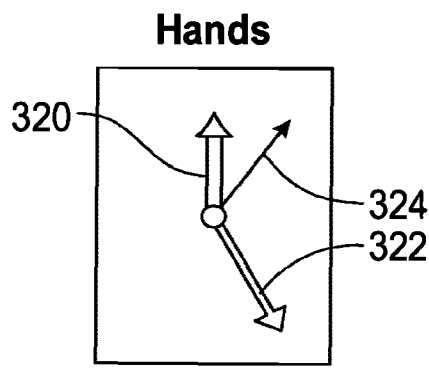

FIG. 3C shows choosing the hands, including the hour hand 320, the minute hand 322 and the second hand 324 if any. The user can choose color, width, texture, and size, and can also choose whether they actually want all of these hands to be visible.

Figure 3D:
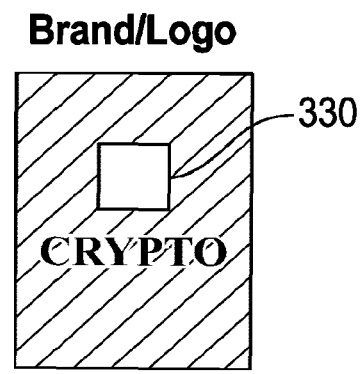

FIG. 3D shows the brand logo selection. This enables selecting a brand or logo or style such as 330 from among the different libraries that have been licensed by the individual user. In another iteration, the company (Watch Skins Corp) will be the entity who owns the license, and the individuals will purchase the face directly from watch skins.

Figure 3E:
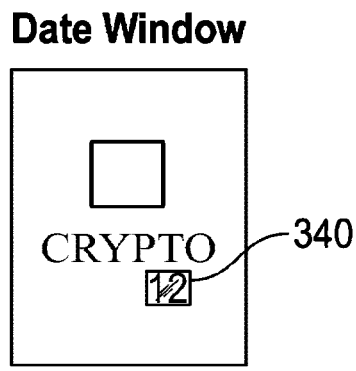

FIG. 3E shows adding a simulated glass "date" window 340 with a working day. This is an optional yes/no field, that allows entering a simulated date, and also allows the user to choose the color of the font and the color of the background on this date.

Figure 3F:
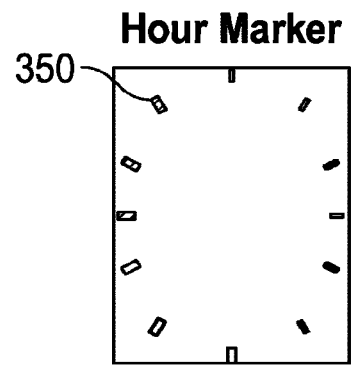

FIG. 3F shows hour markers, being optional as 350. Once selecting these, the hour markers can be modified for color and size.

Figure 4A:
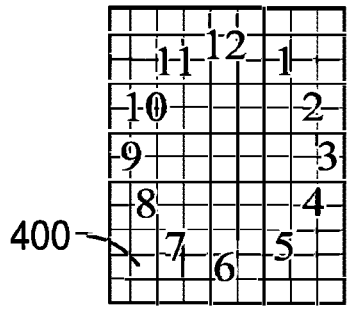
FIGS. 4A-4E show additional aspects of the features.

FIG. 4A shows the different face and background. In FIG. 4A, the face is shown on a black background 400.

Figure 4B:
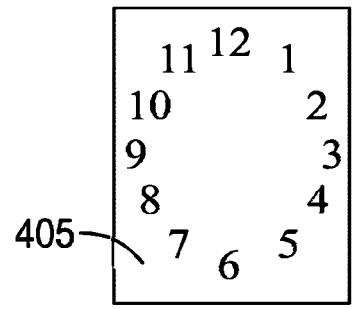

FIG. 4B showing shifting to a white background with gold letters at 405.

Figure 4C:
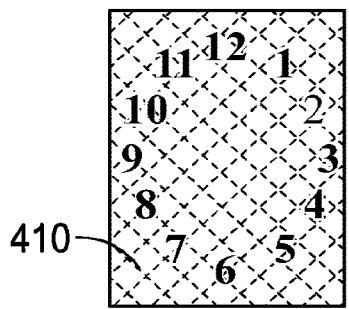

FIG. 4C showing shifting to an orange background with black chrome letters. In an embodiment, the user may be only allowed to select certain color schemes, as allowed by the licensor; with here the system only allowing certain color combinations, which can be set by the licensor.

Figure 4D:
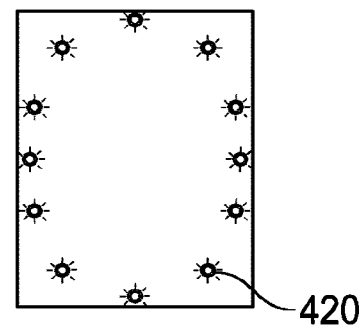

FIG. 4D shows simulated diamonds being added, again this being a yes/no question about whether the user wants to see simulated diamonds or not, and this also allows selecting the size, position and numbers of the diamonds. An embodiment uses high definition video to create shiny diamonds, simulated diamonds and/or shiny metal, using the video to cause sparkling effects when the diamonds are appearing.

The simulated diamonds will sparkle based on watch movement of the wrist, or when the watch "wakes" from an idle condition, or at some other cue. The diamonds are simulated to sparkle by playing the video.

Figure 8:
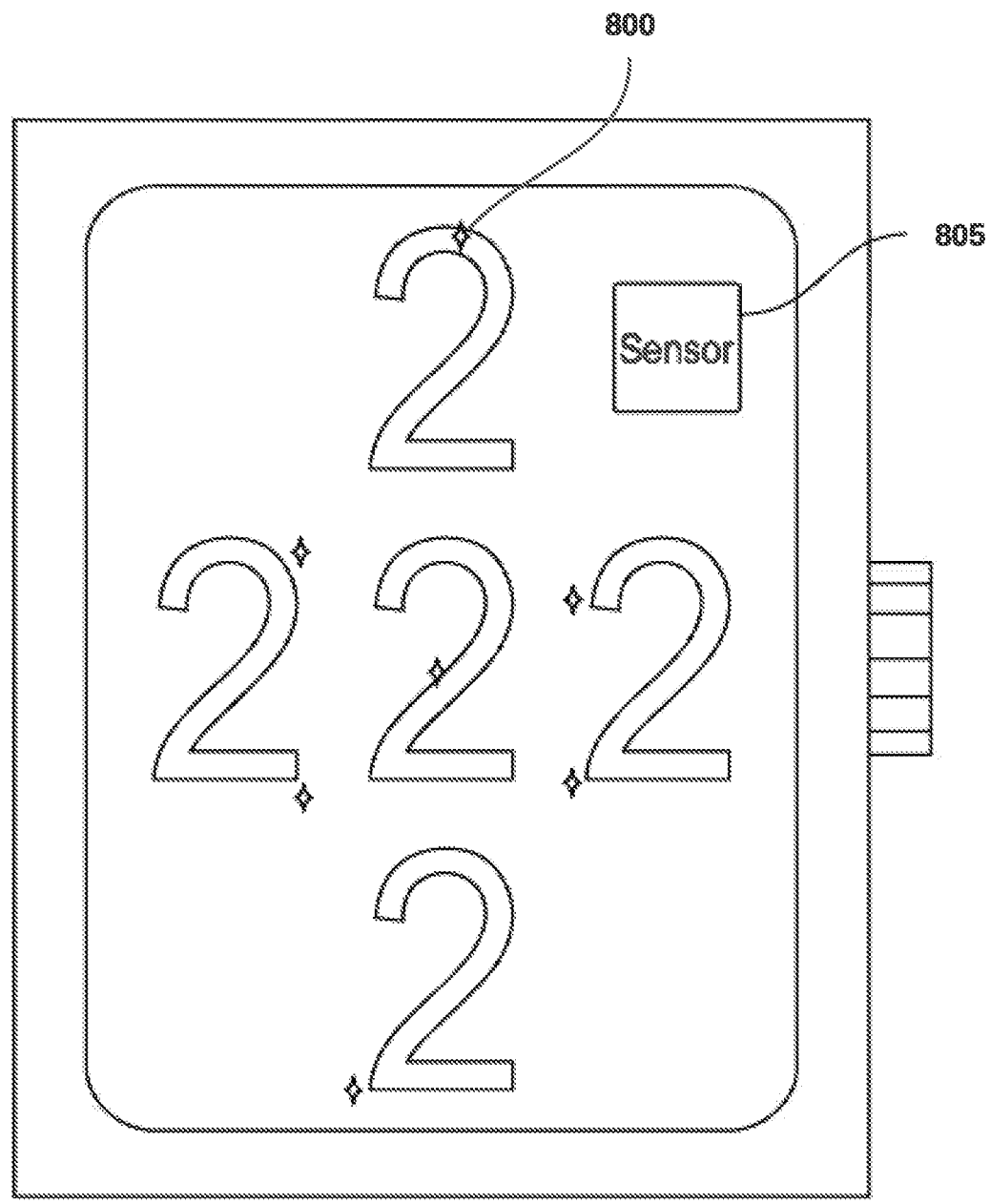
FIG. 8 shows the animation operation.

FIG. 8 illustrates the operation of the sparkling parts. FIG. 8 shows the watch face with a number of sparkling diamonds such as 800 thereon. The sparkling diamonds are on one level of the watch face, while the watch face itself is on another level. This allows a watch or smartphone to use the sensor hardware to play specific animations dependent on the watch's position in three dimensional space. This can be accomplished by assigning the animation to a specific level, and using the same sensor hardware to play specific animations dependent on the watches position in 3 dimensional space. As the watch face is turned between different orientations, as sensed by sensor 805 in the watch and reported to the processor, sparkles 800 are controlled to show different sparkling effects.

Figure 4E:
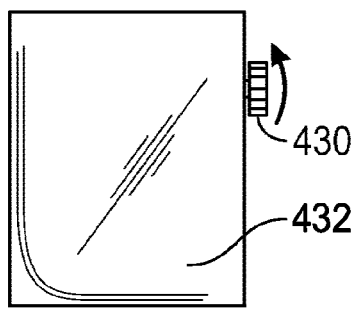

FIG. 4E shows a brightness control, which enables spinning the watch dial 430 to get a brighter face 432. An additional aspect of this is that there can be an increased brightness when the watch moves or wakes up in specific areas of the watch face to create a diamond gleaming in the light or a shiny metal emitting a shine using high definition video.

Figure 4F:
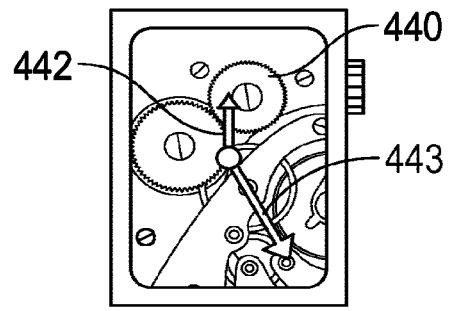
FIG. 4F shows simulated metal gear movements.

FIG. 4F shows another option which enables showing simulated metal gears as a background 440 as a background to the watch, underneath the watch hands. In this way, this can show the simulated "moving metal gears" behind the watch hands to mimic the movement of a highend watch or time piece 442, 443 making it look as though one can see into the watch.

Figure 5:
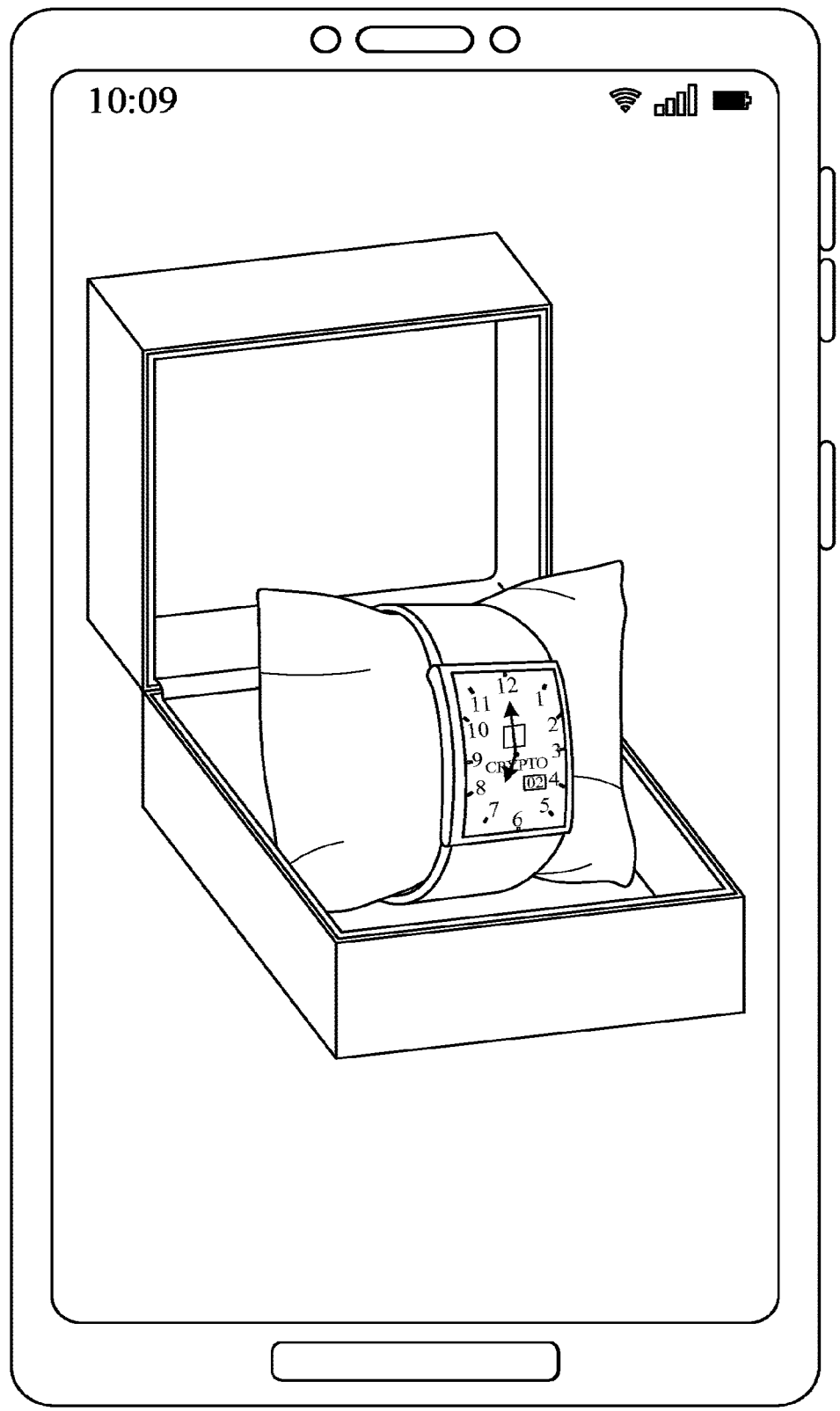
FIG. 5 shows the in-app design.

Once the watch is customized in this way, the user can, in FIG. 5, save the design shown as 500 to add it to a collection. The user may have to make certain in-app purchases to support that collection. For example if the user wants the Crypto™ watch face, and has not already licensed that, the user may be prompted to pay for the in-app purchase to license the specific watch face.

All of this can be done either on the phone app, or can be done on a computer based platform such as a website, and transferred to the phone, or in certain limited circumstances can also be done on the watch face itself.

In an embodiment, there can also be limited edition watch faces. A limited edition watch face can only be purchased for a certain amount of time, for example. In another embodiment, the faces can be limited in the sense that they are a limited series (e.g., 100 copies of the watch face), after which the watch faces will no longer be available as an in app purchase. When a user purchases a limited edition, they are provided with a code that enables them to buy or sell the limited edition face on their watch. This is allowed for every watch that is saved or purchased. In one embodiment, that code can be a token of a blockchain.

Another embodiment allows for digital style readouts—where the colors of fonts can be changed.

Another embodiment can be an animated character.

Another embodiment can be a small video game.

Another embodiment includes a unique set of API data pulled from various data sources such as baseball game scores, player stats or social media messages and incorporated into the watch face to provide real-time data to the watch face user.

Another embodiment displays real-time messages which are associated with the customization on the watch face. As one example, an NFL watch face might display touchdowns in the NFL. A Philadelphia Eagles watch face might display only touchdowns in a Philadelphia Eagles game. A watch face based on a celebrity, for example, might provide tweets from that celebrity or Instagram updates from that celebrity. Watch faces associated with movies or other events can provide access to a private stream of information about that movie or event.

These special watch faces have special real-time messages are limited, and are usable only by the registered owner of the watch face. As described herein, when the watch face is sold or otherwise transferred to another individual that other individual will receive the special watch face updates that are associated with that face they now own.

Another embodiment describes using blockchain in the program code as the cryptographic code. The blockchain identifies the original purchaser, when the original purchaser purchased the watch face, where they purchased the watch face, as well as information about any unique characteristics of the watch. The blockchain can also store information about subsequent purchasers, and can include for example allowable platforms for the watch face. For example, the watch face might only be allowed to be displayed on one specific watch, or on multiple different watches. Every purchased or "saved" face includes this cryptographic token making the watch face certifiable, traceable, and transferable.

Thus, the in app operation allows for customizing, buying, selling and trading of watch face designs. In different embodiments, the user can design their own watch face. However, the user can also purchase other watch faces, e.g. watch faces for sale by other users or watch faces for sale in the app. Each watch face can only be used once (or in another embodiment can be used some limited number of times) and can only be used by the user who is in possession of, or otherwise associated with the block chain. In this way, limited edition watch faces are made, that can be exchanged by using the ownership exchanging features of the block chain, preventing the watch face from being reused more times than the licensee specifies. This system ensures that the watch face is being used by only the authorized user, and also prevents a registered user from having more than one copy of the same watch face.

This allows watch faces that are truly limited, just like a true watch line where a limited number of items have been produced. The incorporation of the cryptographic block chain as part of the watch face pattern ensures that no knockoff versions can be sold outside the chain of control of the creator.

In one embodiment, the watch faces can only be purchased on the app store or the website watchskins.com, ultimately protecting the brand of watch chosen from the consumer.

The creation of unique and verifiable block chain tokens limits the number of each watch face that can be created, and also avoids the possibility of counterfeiting.

Figure 6:
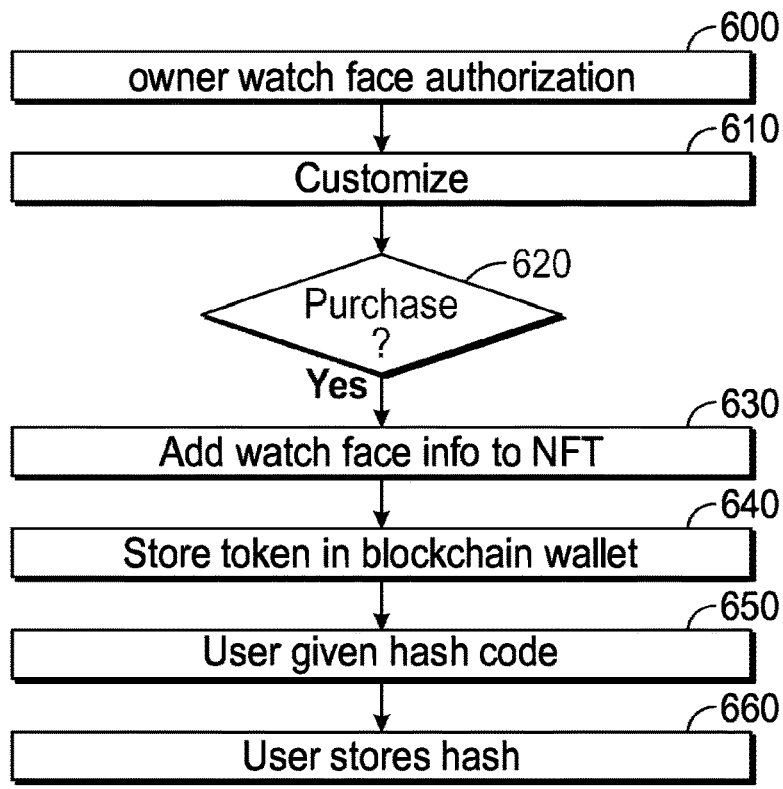
FIG. 6 shows the function of obtaining the watch face.

The operation is shown in the flowchart of FIG. 6. In an embodiment, a certain limited number of watch faces of a certain type can be made. For example, the company Crypto™ may license the watch face company to make 10 watch faces. The "owner" creates a watch face authorization at 600. The user can specify details of the watch face at 610, for example changing the varying elements of a watch face, including hands, numbers, bezels, fonts, textures, colors, styles, date windows, background art, photos and animations and other features and arrange the spaces in the way they choose, as described above. Once completely customized, the user is given the option to purchase at 620.

Once purchased, the information indicative of the watch face and it's unique characteristics is added to a non-fungible token or NFT of a blockchain system, at 630. A non-fungible token, as used according to an embodiment, is a special kind of cryptographic token that represents a unique item, where in general one non-fungible token is not interchangeable with another non-fungibletoken. Fungible tokens, usually used for blockchain currency, in contrast, have each token being identical.

The non-fungible token is, in one embodiment, an ERC-721 Ethereum blockchain token. In another embodiment, the information indicative of the watch face and it's unique characteristics is added to a distributed ledger database or smart contract, or any other cryptographic framework which can maintain a record of current registered owners, enable changing the current registered owners, and cryptographically prevent unauthorized changing of the contents.

A user's tokens are stored into a blockchain wallet at 640, and the user who owns the non-fungible token is given a unique identifying block chain "hash" code at 650 which is stored by the user at 660. In one embodiment, both the hash code and the blockchain wallet are stored in an electronic memory on the watch itself.

In another embodiment, the wallet can be stored on the same server which the user uses in order to create the unique blockchain. In another embodiment the hash code and blockchain wallet can be stored on a distributed ledger database.

Each non-fungible token is associated with a specific watch face. Once the watch face has been created, only the owner of the token associated with that watch face can display the watch face on their watch.

Figure 7:
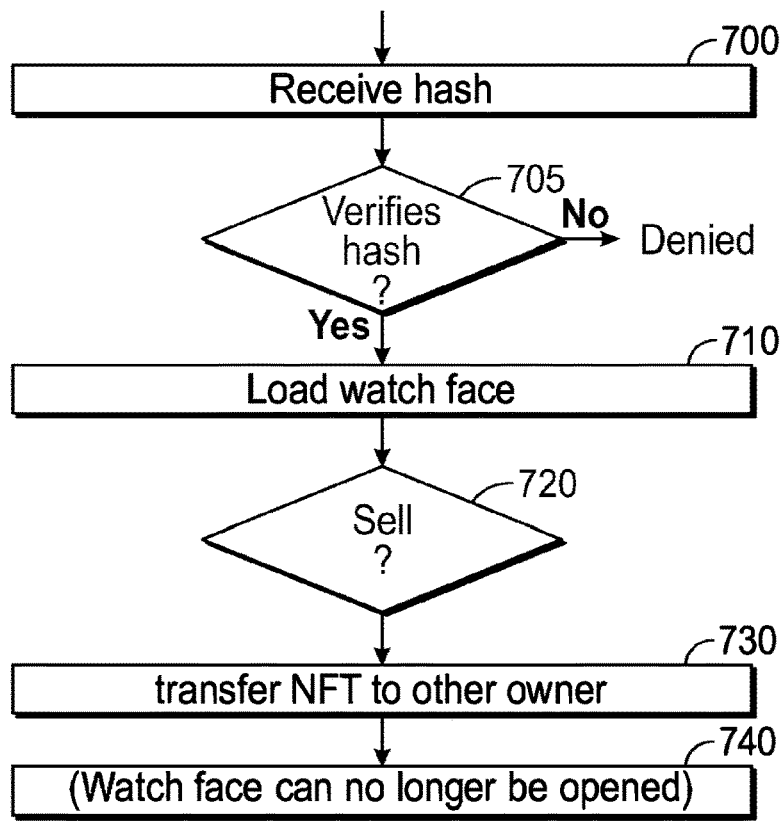
FIG. 7 shows a flowchart of receiving the hash value into a computer that verifies the ownership, and also shows a function of selling the watch face to another user.

The operation of the watch is illustrated in the flowchart of FIG. 7 which can be carried out in a processor in the watch (or a controlling computer associated with the watch). The processor receives the cryptographic hash code at 700. The processor also has information indicative of an identity of the user associated with the watch in question.

At 705 the watch verifies the hash code to belong to the owner of the same watch the data for the watch face can be contained within metadata within the cryptographic token, for example. In an alternative embodiment, the watch face can be loaded from a server, or can be enabled by the determination that the hash code is in fact correct and associated with the owner. In an embodiment, where this uses an Ethereum token, the function "owner of" is used on the token to return the address of the owner of the token. This allows the owner of the token to be determined using its ID.

The user can decide at any point to sell or trade their digital watch face to another person. Once selling or trading the digital watch face, the seller can no longer use that watch face. In a similar way to that discussed above, different ownership functions can be used on the Ethereum open-source network, using the "take ownership" or transfer" function. The transfer can be used to allow the owner of a token to transfer the ownership of that token to another user. After transferring the ownership of the token, the original owner will fail at any attempt to open the watch face as shown in 740, because the ownership of the token will no longer show the "original owner".

The system has been described relative to an Ethereum block chain token, however it should be understood that any other kind of block chain or cryptographic sequence which is similar can be used. For example, an alternative system can be done on "Go Chain". The system can be used over a public block chain, private block chain, or hybrid blockchain, can be used over a distributed ledger, can be used with a smart contract system, or any other kind of cryptographic system which can maintain ownership information as described above.

Because these watch faces are each limited edition (currently contemplated as being single edition watch faces), there can be a robust secondary market for the products. The user can only display a watch face if they purchase it either from the original seller, or on the secondary market as someone else's used watch face. Hence, the platform can be a market for both new and used watch faces to be sold worldwide.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system configured to facilitate presentation of a watch face on a watch display carried by a wearable watch device, the watch face being associated with a cryptographic token such that exclusive ownership of the watch face by a user is indicated to the system by the cryptographic token being held by a blockchain wallet associated with the user, the system comprising:
   one or more processors configured by machine readable code to:
      receive a user request from a client computing platform associated with the user to present the watch face on the watch display;
      verify that the blockchain wallet associated with the user holds the cryptographic token;
      responsive to verification that the blockchain wallet holds the cryptographic token, effectuate the presentation of the watch face on the watch display; and
      responsive to failure of the verification that the blockchain wallet holds the cryptographic token, prevent the presentation of the watch face on the watch display.

2. The system of claim 1, wherein the one or more processors are further configured by the machine readable code to effectuate purchase of the watch face by facilitating a transfer of consideration on a blockchain from the blockchain wallet associated with the user in exchange for the cryptographic token associated with the watch face.

3. The system of claim 1, wherein the watch face is a customized watch face with customizations including one or more of a look of numbers on the watch face, a font of the numbers, a style of the numbers, a look of clock hands, or a thickness of the clock hands.

4. The system of claim 1, wherein the watch face includes information transmitted and displayed in real time.

5. The system of claim 1, wherein the cryptographic token is a non-fungible token.

6. The system of claim 1, wherein the blockchain wallet is associated with an Ethereum blockchain system.

7. The system of claim 1, wherein the one or more processors are further configured by the machine readable code to facilitate a transfer of the cryptographic token from the blockchain wallet associated with the user to an other blockchain wallet associated with an other user, and wherein responsive to the transfer of the cryptographic token from the blockchain wallet to the other blockchain wallet, the watch face is prevented from being presented on the watch display.

8. The system of claim 7, wherein a change owner function of a blockchain system is used for the transfer of the cryptographic token.

9. A method of facilitating presentation of a watch face on a watch display carried by a wearable device, the watch face being associated with a cryptographic token such that exclusive ownership of the watch face by a user is indicated by virtue of the cryptographic token being held by a blockchain wallet associated with the user, the method comprising:
   receiving a user request from a client computing platform associated with the user to present the watch face on the watch display;
   verifying that the blockchain wallet associated with the user holds the cryptographic token;
   responsive to verification that the blockchain wallet holds the cryptographic token, effectuating the presentation of the watch face on the watch display; and
   responsive to failure of the verification that the blockchain wallet holds the cryptographic token, preventing the presentation of the watch face on the watch display.

10. The method of claim 9, further comprising:
    effectuating purchase of the watch face by facilitating a transfer of consideration on a blockchain from the blockchain wallet associated with the user in exchange for the cryptographic token associated with the watch face.

11. The method of claim 9, wherein the watch face is a customized watch face with customizations including one or more of a look of numbers on the watch face, a font of the numbers, a style of the numbers, a look of clock hands, or a thickness of the clock hands.

12. The method of claim 9, wherein the watch face includes information transmitted and displayed in real time.

13. The method of claim 9, wherein the cryptographic token is a non-fungible token.

14. The method of claim 9, wherein the blockchain wallet is associated with an Ethereum blockchain system.

15. The method of claim 9, further comprising:
    facilitating a transfer of the cryptographic token from the blockchain wallet associated with the user to an other blockchain wallet associated with an other user, and wherein responsive to transfer of the cryptographic token from the blockchain wallet to the other blockchain wallet, the watch face is prevented from being presented on the watch display.

16. The method of claim 15, wherein a change owner function of a blockchain system is used for the transfer of the cryptographic token.

* * * * *